(12) United States Patent
Xie et al.

(10) Patent No.: US 7,931,836 B2
(45) Date of Patent: Apr. 26, 2011

(54) METHOD FOR MAKING HIGH PURITY AND FREE FLOWING METAL OXIDES POWDER

(75) Inventors: Liangde Xie, Pearl River, NY (US); Mitchell Dorfman, Smithtown, NY (US); Ashish Patel, Long Valley, NJ (US); Michael Mueller, Long Valley, NJ (US)

(73) Assignee: Sulzer Metco (US), Inc., Westbury, NY (US)

( * ) Notice: Subject to any disclaimer, the term of this patent is extended or adjusted under 35 U.S.C. 154(b) by 1088 days.

(21) Appl. No.: 11/584,747

(22) Filed: Oct. 23, 2006

(65) Prior Publication Data

US 2007/0110655 A1 May 17, 2007

Related U.S. Application Data

(60) Provisional application No. 60/728,760, filed on Oct. 21, 2005.

(51) Int. Cl.
*B29B 9/00* (2006.01)
(52) U.S. Cl. ............................ 264/15; 264/80
(58) Field of Classification Search .................. None
See application file for complete search history.

(56) References Cited

U.S. PATENT DOCUMENTS

| | | | |
|---|---|---|---|
| 3,943,211 A * | 3/1976 | Dickey et al. | 264/15 |
| 4,783,214 A | 11/1988 | Kemp, Jr. et al. | |
| 4,952,144 A * | 8/1990 | Hansz et al. | 425/10 |
| 5,124,091 A * | 6/1992 | Paliwal et al. | 264/15 |
| 6,207,924 B1 | 3/2001 | Trassy | |
| 2002/0160189 A1 | 10/2002 | Wataya et al. | |
| 2003/0209820 A1 * | 11/2003 | Paris et al. | 264/15 |
| 2004/0180991 A1 * | 9/2004 | Che et al. | 523/223 |
| 2005/0147852 A1 | 7/2005 | Harada et al. | |

FOREIGN PATENT DOCUMENTS

| | | |
|---|---|---|
| EP | 0259844 A | 3/1988 |
| EP | 1239055 A | 9/2002 |
| FR | 2690638 A1 | 11/1993 |
| JP | 2002346377 A | 12/2002 |
| WO | WO 84/02864 A | 8/1984 |
| WO | WO 98/54935 A | 12/1988 |

OTHER PUBLICATIONS

"Amperit Thermal Spray Powder Catalog," H.C. Starck GmbH, published 2005.
Online Catalog "Product Information Amperit 832 Catalog," H.C. Starck GmbH, found at http://www.hcstarck.com/medien/dokumente/document_Produktinfo832.pdf.
"Amperit Thermal Spray Powder Catalog," H.C. Starck, published 1995.
European Search Report, Mar. 23, 2007, European Patent Application No. 06122150.

* cited by examiner

*Primary Examiner* — Mary Lynn F Theisen
(74) *Attorney, Agent, or Firm* — Greenblum & Bernstein, P.L.C.

(57) ABSTRACT

According to aspects of the present invention, metal oxide powder, such as yttria and alumina powder (feed material), is processed using a plasma apparatus. The process generally consists of in-flight heating and melting of the feed material by the plasma apparatus. The plasma apparatus contains a plasma torch with required power supply and cooling systems, a powder feeder, a chamber to collect the powder and a dedusting system. The heated powder forms molten spherical droplets that are rapidly cooled under free fall conditions. The plasma densification process removes some impurity oxides, modifies the morphology of the particle and increases the apparent density of the powder.

29 Claims, 2 Drawing Sheets

METHOD FOR MAKING HIGH PURITY AND FREE FLOWING METAL OXIDES POWDER

CROSS REFERENCE TO RELATED APPLICATIONS

This application claims priority under 35 U.S.C. §119(e) from U.S. Provisional Patent Application No. 60/728,760, filed on Oct. 21, 2005, which is incorporated herein in its entirety by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates generally to manufacture of ceramic powders for coating applications. Particularly, the present invention relates to the purification of metal oxide powder, such as yttria and alumina powders, for use in thermal spray applications.

2. Description of Related Art

High purity metal oxide materials are essential to scientific research and many high tech applications and manufacturing processes. These materials are used to make components or form surface coatings of similar purity. For example, other references have reported a yttrium oxide surface coating for semiconductor IC processing vacuum chambers and a multi-layer coating system of high purity yttrium oxide and aluminum oxide for components inside a plasma treatment chamber. Others have disclosed a high purity aluminum oxide barrier layer for electrostatic chuck.

Thermal spray processes, especially plasma spray process, are widely used to form metal oxide coatings on various substrates. In order to deposit a high purity metal oxide coating, it is required that the feedstock material has to have a high purity and be able to be injected into the flame stably and consistently.

Complicated and expensive chemical processes are usually employed to manufacture high purity metal oxides. In order to manufacture materials suitable for thermal spray processes, several processes are currently used to modify the morphology of the material. Among them, plasma densification process can manufacture powders of spherical morphology and high density. Both of these characteristics improve the flowability of the powder. Good flowability of the feedstock helps to ensure the stability and reproducibility of the coating deposition process, and thus the consistency of coating quality.

Means for manufacturing highly purified yttria powder currently used in the art are costly and produce powder with comparatively poor flow characteristics. There remains a need in the art for a powder purification process that also improves flow characteristics and costs less than presently used methods.

SUMMARY OF THE INVENTION

According to aspects of the present invention, metal oxide powder, such as yttria and alumina, manufactured using flame pyrolysis, agglomeration, fusing and crushing, chemical precipitation or other chemical processes (called the feed material) is processed using a plasma apparatus. The process generally consists of in-flight heating and melting of the feed material by the plasma apparatus. The plasma apparatus contains a plasma torch with required power supply and cooling systems, a powder feeder, a chamber to collect the powder and a dedusting system. The heated powder forms molten spherical droplets that are rapidly cooled under free fall conditions. Depending on the size and apparent density of the treated powder, their time of flight is controlled such that the molten droplets have ample time for complete solidification before reaching a collection chamber. Finer particles, entrained by the plasma gases, are recovered in a dedusting filter downstream of the primary collection chamber.

The plasma densification process can be used to improve the physical and chemical properties of the powder feed material in a number of ways, depending in part on the composition and structure of the base powder material. For example, improved powder flow properties can be obtained. Smooth spheroidized particles provide a more consistent flow than spherical or jagged particles alone while feeding through a thermal spray gun. This allows flows to run at required rates without clogging problems. Another improvement is decreased powder porosity. Porosity is removed when the base powder material is melted. Reduced porosity is beneficial in many powder metallurgy applications and produces denser coatings. Similarly, the overall density of the treated powder is increased by having spherical particles, resulting in denser coating or parts. Another exemplary improvement is enhanced purification of the powder. The in-flight melting process can enhance powder purity through the vaporization of specific impurities. A single pass or multiple passes may be used to reduce powder contaminants to desired levels depending on factors such as the base powder material's initial composition.

In one aspect of the invention a method of processing a metal oxide powder, yttria, is provided. The method includes the steps of injecting the powder feed material into a plasma stream; melting the powder feed material with said plasma stream to form molten droplets; and cooling said molten droplets under free-fall conditions so as to form frozen spherical droplets, wherein said frozen spherical droplets have higher density and purity levels than the powder feed material. In another aspect of the invention a high-purity free-flowing metal oxide powder is provided. The powder is made using the method mentioned above and discussed in greater detail hereafter.

Plasma densification and spheroidization result in improved particle surface finish. The sharp edges of individual particles are eliminated through the plasma densification process. The resulting coating surface can then become smoother by the improved individual powder particle smoothness. Another benefit is the resulting coating will be denser due to the higher density of the individual particles.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

The detailed description that follows will further describe each aspect of the above invention.

Figure 1:
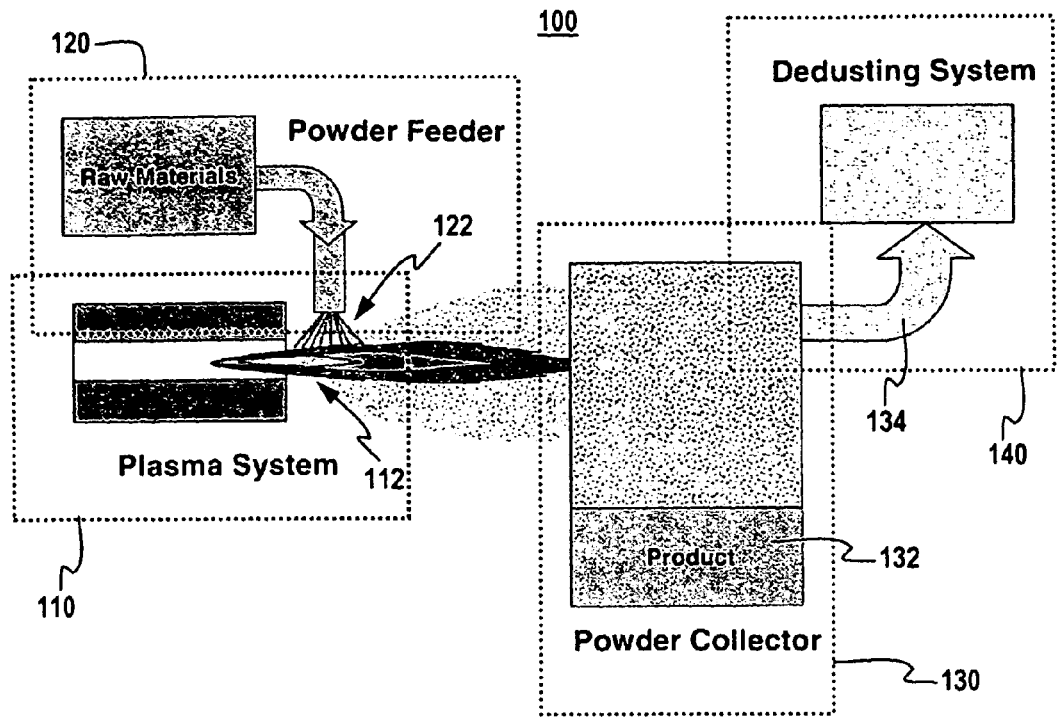
FIG. 1 provides a schematic of a plasma apparatus for use in making high purity and free flowing metal oxide powder in accordance with the present invention.

FIG. 1 shows a schematic of plasma apparatus 100 used for making high purity and free flowing metal oxide powder in accordance with the present invention. A plasma system 110 is provided that generates a plasma plume 112. The plasma system 110 generally includes a plasma torch, a power supply and a cooling system (each not shown). The plasma torch may be a DC plasma torch or an induction plasma torch. Raw metal oxide material in powder form 122 (i.e., feed material) is injected from a powder feeder 120 into the plasma plume 112. The raw material may be ceramic oxide powder produced using flame pyrolysis, agglomeration, fusing and crushing, chemical precipitation or other chemical processes. The raw material powder is heated by the plasma stream 112 and forms molten spherical droplets that gradually cool in flight. The resultant powder particle spheres 132 are collected in a powder collector 130, while finer particles 134, entrained by the plasma gases, are recovered in a dedusting system 140 downstream of the primary collector 130.

The plasma torch can be a direct current plasma torch or an induction plasma torch. The plasma system 110 can operate in ambient air, low pressure, vacuum or controlled atmosphere. Generally, in certain embodiments, more than about 90% of the powder 122 fed into the plasma system can be melted or partially melted and then solidified and collected in the powder collector 130. During this process, impurities like silica are reduced. Meanwhile, most of the porosity in the starting powder 122 is removed during the melting and solidification process. The solidified powder 132 has a smooth surface and a spherical morphology. As an example, plasma densified yttria powder purified in accordance with the present invention has a high purity (greater than about 99%), a high density (greater than about 1.5 g/cc) and good flowability (less than about 60 s/50 g). The preferred apparent density, flowability and particle size distribution are about 1.8 g/cc, about 50 s/50 g and about 5-100 µm, respectively. The powder is especially well suited for use to make coatings subject to high chemical corrosion and plasma erosion in an environment containing a halogen gas.

Figure 2:
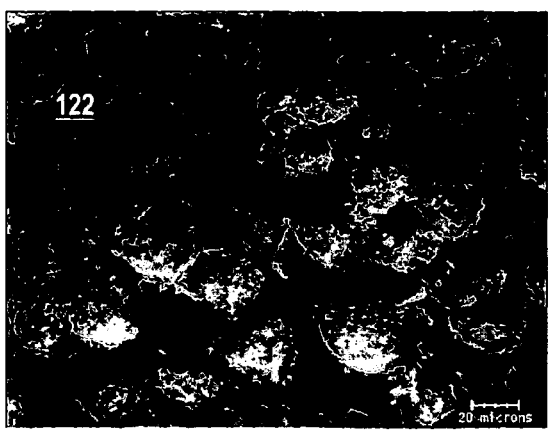
FIG. 2 provides an image of powder material without plasma densification.
Figure 3:
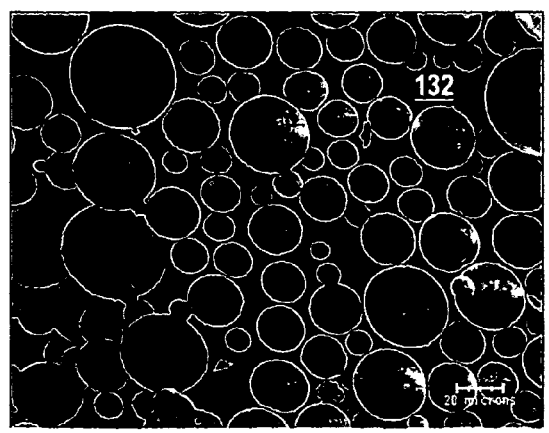
FIG. 3 provides an image of powder material after plasma densification.

FIG. 2 provides an image of powder material prior to plasma densification. As shown in FIG. 2, the raw powder starting material 122 has an irregular shape and the surface of each particle is rough. In addition, the particles tend to agglomerate. FIG. 3 provides an image of powder material after plasma densification in accordance with the present invention. After plasma densification, the shape of each particle 132 becomes spherical and the surface of each particle is smooth. Furthermore, no agglomeration of particles is observed.

The chemistry of the raw and treated powders was analyzed using ICP-OE or ICP-MS method. As shown in Table 1, the purity of Yttira increased from 99.95% to 99.98% and the purity of alumina increased from 99.85% to 99.90%. Meanwhile, the content of some impurity oxides, especially sodium and silicon dioxide, reduced significantly after plasma densification.

TABLE 1

| | Powder chemistry | | | |
|---|---|---|---|---|
| | Yttria (wt %) | | Alumina (wt %) | |
| Constituent | Before plasma densification | After plasma densification | Before plasma densification | After plasma densification |
| Yttrium Oxide | 99.95 | 99.98 | — | — |
| Aluminum Oxide | 0.006 | 0.003 | 99.85 | 99.90 |
| Sodium | 0.006 | <0.002 | 0.10 | 0.05 |
| Silicon Dioxide | 0.016 | <0.002 | 0.01 | 0.01 |

When measured using ASTM B212-99 standard, the apparent density of plasma densified yttria powder increased from 1.2 to 2.2 g/cm$^3$. The increase of apparent density and the modification of particle morphology help to improve the flowability, which will ensure the stability and reproducibility of the coating deposition process, and thus the consistency of coating quality.

Figure 4:
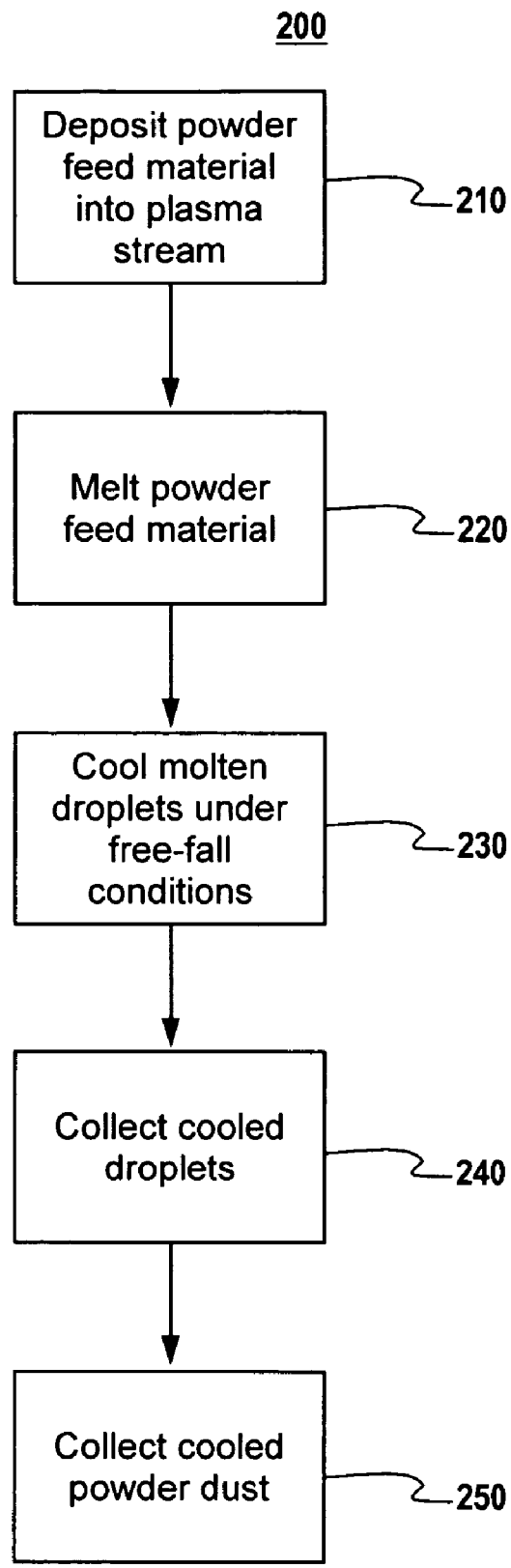
FIG. 4 provides a flow chart of a method for processing a metal oxide powder.

FIG. 4 provides a flow chart of one embodiment of a method 200 for processing a metal oxide powder. In step 210, metal oxide powder feed materials are injected into a plasma stream, such as a plasma stream from apparatus described above with respect to FIG. 1. In step 220, the plasma stream melts the powder feed material into molten droplets. The plasma stream may also burn out impurities in the feed materials. Next, in step 230, the molten droplets are cooled under free-fall conditions so as to form frozen spherical droplets. In step 240, the frozen droplets are collected in a powder collection chamber. In step 250, preferably, any droplets below the required sizes (e.g., dust particles) are collected and separated using, for example, a dedusting system. Steps 240 and 250 may be conducted simultaneously or sequentially.

In summary, high-purity free-flowing metal oxide powders can be manufactured using a plasma densification process. The plasma densification process removes some impurity oxides, modifies the morphology of the particle and increases the apparent density of the powder. As a result, the coating made from a plasma densified powder will have a higher purity and more consistent quality. The aspects and other advantages of the invention will be realized and attained by the structure particularly pointed out in the written description hereof. It is to be understood that both the foregoing general description and detailed description are exemplary and explanatory and are intended to provide further explanation of the invention as will be later claimed.

The invention claimed is:

1. A method of processing a metal oxide powder comprising the steps of:
   injecting a powder feed material into a plasma stream;
   melting the powder feed material with said plasma stream to form molten droplets; and
   cooling said molten droplets under free-fall conditions so as to form frozen spherical droplets such that said molten droplets have ample time for complete in-flight solidification before reaching a collection chamber,
   wherein said frozen spherical droplets have higher density and purity levels than the powder feed material.

2. The method of claim 1, further comprising the step of collecting in the collection chamber said frozen spherical droplets that are above a predetermined size.

3. The method of claim 2, wherein said step of collecting further comprises separating said frozen spherical droplets that are below the predetermined size.

4. The method of claim 3, wherein said frozen spherical droplets that are below the predetermined size are recovered in a dedusting filter.

5. The method of claim 1, wherein a particle size of the collected frozen spherical droplets is between about 5 μm and 150 μm.

6. The method of claim 1, wherein a duration of said free-fall conditions is varied depending on a size and apparent density of said molten droplets.

7. The method of claim 1, wherein the powder feed material is frozen spherical droplets from a previous densification process.

8. The method of claim 1, wherein the frozen spherical droplets have a purity of higher than 99% by weight, an apparent density of higher than about 1.5 g/cc, and a flowability of less than about 60 s/50 g.

9. The method of claim 1, wherein the powder feed material is a metal oxide powder produced using flame pyrolysis, agglomeration, fusing and crushing, chemical precipitation or a chemical process.

10. The method of claim 1, wherein a duration of said free-fall conditions are varied depending on a size and apparent density of said molten droplets, wherein the frozen spherical droplets collected in the collection chamber have a size equal or above a predefined size, and wherein the method further comprises:
    separating finer frozen spherical droplets that are below the predefined size from the frozen spherical droplets collected in the collection chamber; and
    recovering the finer frozen droplets downstream of the collection chamber.

11. The method of claim 1, wherein the metal oxide power comprises one of yttria and alumina.

12. A method of processing a metal oxide powder comprising:
    injecting a powder feed material into a plasma stream;
    melting the powder feed material with said plasma stream to form molten droplets; and
    cooling said molten droplets under free-fall conditions so as to form frozen spherical droplets such that said molten droplets have ample time for complete in-flight solidification before reaching a collection chamber,
    wherein said frozen spherical droplets have higher density and purity levels than the powder feed material, and
    wherein the method forms a free-flowing powder having higher purity than the powder feed material.

13. The method of claim 12, further comprising collecting said frozen spherical droplets in the collection chamber that are above a predetermined size.

14. The method of claim 13, wherein said collecting further comprises separating said frozen spherical droplets that are below the predetermined size.

15. The method of claim 14, wherein said frozen spherical droplets that are below the predetermined size are recovered in a dedusting filter.

16. The method of claim 13, wherein a particle size of the collected frozen spherical droplets is between about 5 um and 150 μM.

17. The method of claim 12, wherein a duration of said free-fall conditions are varied depending on a size and apparent density of said molten droplets.

18. The method of claim 12, wherein the powder feed material is frozen spherical droplets from a previous densification process.

19. The method of claim 12, wherein the frozen spherical droplets have a purity of higher than 99% by weight, an apparent density of higher than about 1.5 g/cc, and a flowability of less than about 60s/50g.

20. The method of claim 12, wherein the powder feed material is a metal oxide powder produced using flame pyrolysis, agglomeration, fusing and crushing, chemical precipitation or a chemical process.

21. The method of claim 12, wherein a duration of said free-fall conditions are varied depending on a size and apparent density of said molten droplets, wherein the frozen spherical droplets collected in the collection chamber have a size equal or above a predefined size, and wherein the method further comprises:
    separating finer frozen spherical droplets that are below the predefined size from the frozen spherical droplets collected in the collection chamber; and
    recovering the finer frozen droplets downstream of the collection chamber.

22. The method of claim 12, wherein the metal oxide power comprises one of yttria and alumina.

23. A method of making a high-purity free-flowing powder comprising:
    injecting a powder feed material into a plasma stream;
    melting the powder feed material with said plasma stream to form molten droplets; and
    cooling said molten droplets under free-fall conditions so as to form frozen spherical droplets,
    wherein, during cooling, said molten droplets have ample time for complete in-flight solidification before reaching a collection chamber.

24. A powder in accordance with claim 23, wherein the frozen spherical droplets have a higher purity level than the powder feed material.

25. The method of claim 23, wherein the frozen spherical droplets have improved powder flow properties over those of the powder feed material.

26. The method of claim 23, wherein the frozen spherical droplets have decreased powder porosity than that of the powder feed material.

27. The method of claim 23, wherein an overall density of powder of the frozen spherical droplets is greater than a density of the powder feed material.

28. The method of claim 23, wherein a purity of the frozen spherical droplets is greater than 99%, a density of the frozen spherical droplets is greater than 1.0 g/cc, and a flowability of the frozen spherical droplets are less than 60s/50g.

29. The method of claim 23, wherein a duration of said free-fall conditions are varied depending on a size and apparent density of said molten droplets, wherein the frozen spherical droplets collected in the collection chamber have a size equal or above a predefined size, and wherein the method further comprises:
    separating finer frozen spherical droplets that are below the predefined size from the frozen spherical droplets collected in the collection chamber; and
    recovering the finer frozen droplets downstream of the collection chamber.

* * * * *